United States Patent [19]

Eggert et al.

[11] Patent Number: 5,000,617

[45] Date of Patent: Mar. 19, 1991

[54] STORE

[76] Inventors: Uwe Eggert, Cedergatan 12, S-335 00 Gnosjö ; Ole M. Kvamsdal, Mättsund 6503; Alf Johansson, Bjursträsk 5570, both of S-951 00 Luleå, all of Sweden

[21] Appl. No.: 424,276
[22] PCT Filed: Jan. 25, 1988
[86] PCT No.: PCT/SE88/00026
§ 371 Date: Dec. 18, 1989
§ 102(e) Date: Dec. 18, 1989
[87] PCT Pub. No.: WO88/08608
PCT Pub. Date: Nov. 3, 1988

[30] Foreign Application Priority Data

Apr. 22, 1987 [SE] Sweden ................................. 8701629
Dec. 1, 1987 [SE] Sweden ................................. 8704781

[51] Int. Cl.$^5$ ............................ B63G 5/00; G21F 9/34
[52] U.S. Cl. ...................................... 405/128; 405/55
[58] Field of Search ........................ 376/272, 273, 274; 252/626, 628, 633; 405/128, 53, 55

[56] References Cited

U.S. PATENT DOCUMENTS

| | | | |
|---|---|---|---|
| 3,925,992 | 12/1975 | Backstrom | 376/273 |
| 3,996,751 | 12/1976 | Hallenius et al. | 376/273 |
| 4,189,254 | 2/1980 | Akesson | 405/128 |
| 4,192,629 | 3/1980 | Hallenius et al. | 405/128 |
| 4,652,181 | 3/1987 | Bergman et al. | 405/128 |
| 4,678,369 | 7/1987 | Glaser | 405/128 |
| 4,701,280 | 10/1987 | Canevall | 376/272 |
| 4,708,522 | 11/1987 | Bergman et al. | 405/128 |
| 4,708,523 | 11/1987 | Sagefors et al. | 405/128 |
| 4,725,164 | 2/1988 | Sagefors | 405/128 |

FOREIGN PATENT DOCUMENTS

| | | |
|---|---|---|
| 433150 | 5/1984 | Sweden . |
| 433684 | 6/1984 | Sweden . |
| 2166282 | 4/1986 | United Kingdom . |

Primary Examiner—Daniel D. Wasil
Attorney, Agent, or Firm—Dvorak and Traub

[57] ABSTRACT

The present invention relates to a store (1) for the storage of environmentally harmful substances (2), such as stable toxic compounds and long-lived nuclear materials, etc., which store comprises a number of cavities (6) in rock intended for holding the substances (2) in question, with a roof (8) above said cavities, and with the cavities (6)in question being surrounded by a hydraulic barrier (7). Amongst other things, the invention permits a passive dry store to be achieved. Holding cavities for storage are formed by drilled vertical holes (6) which extend down to a level (10) situated above a subjacent drainage and ventilation zone (11). The hydraulic barrier (7), which is displaced laterally in relation to the storage boreholes (6), and the ventilation holes (12) situtated to the side are connected to a subjacent drainage and ventilation zone (9).

20 Claims, 5 Drawing Sheets

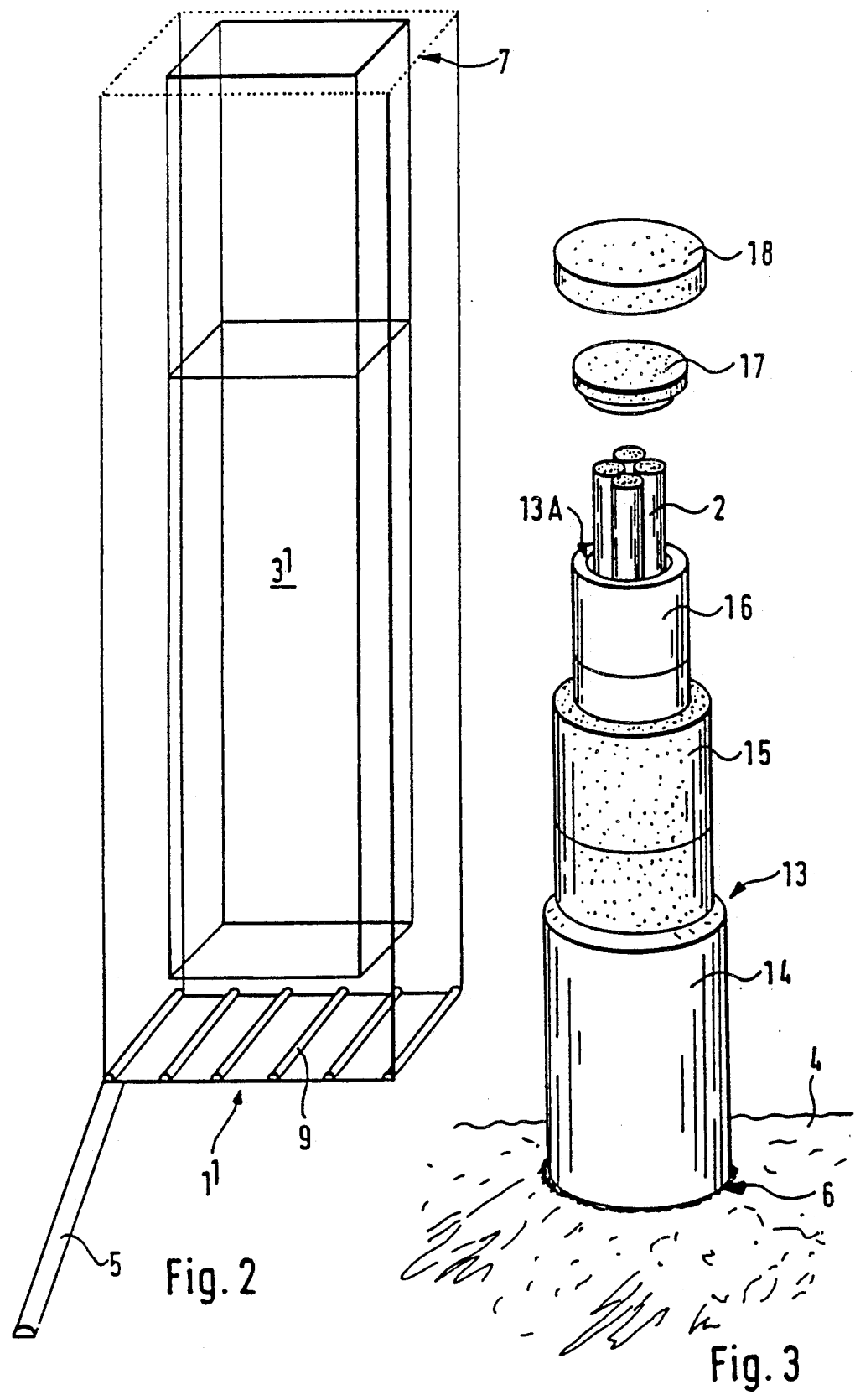

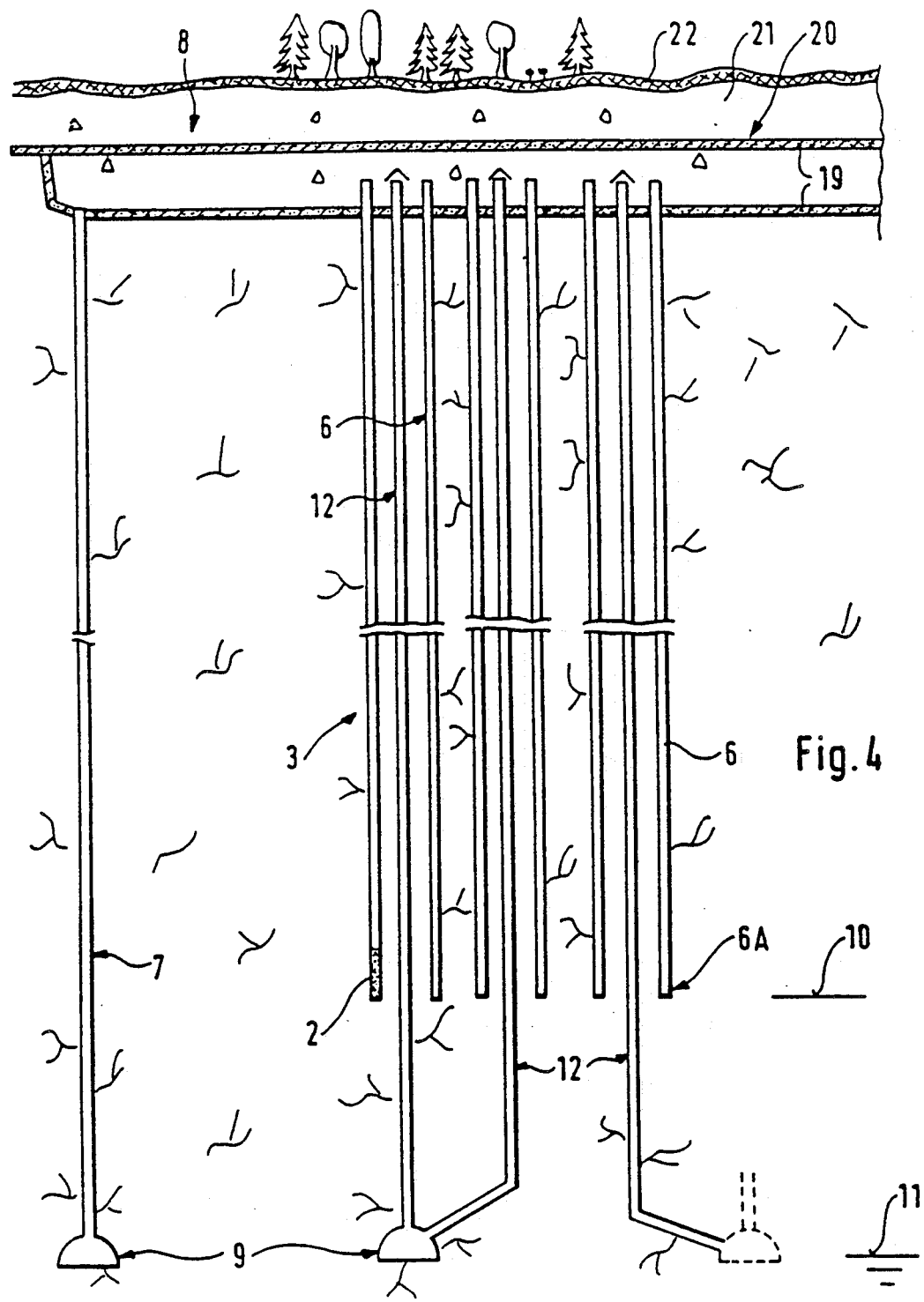

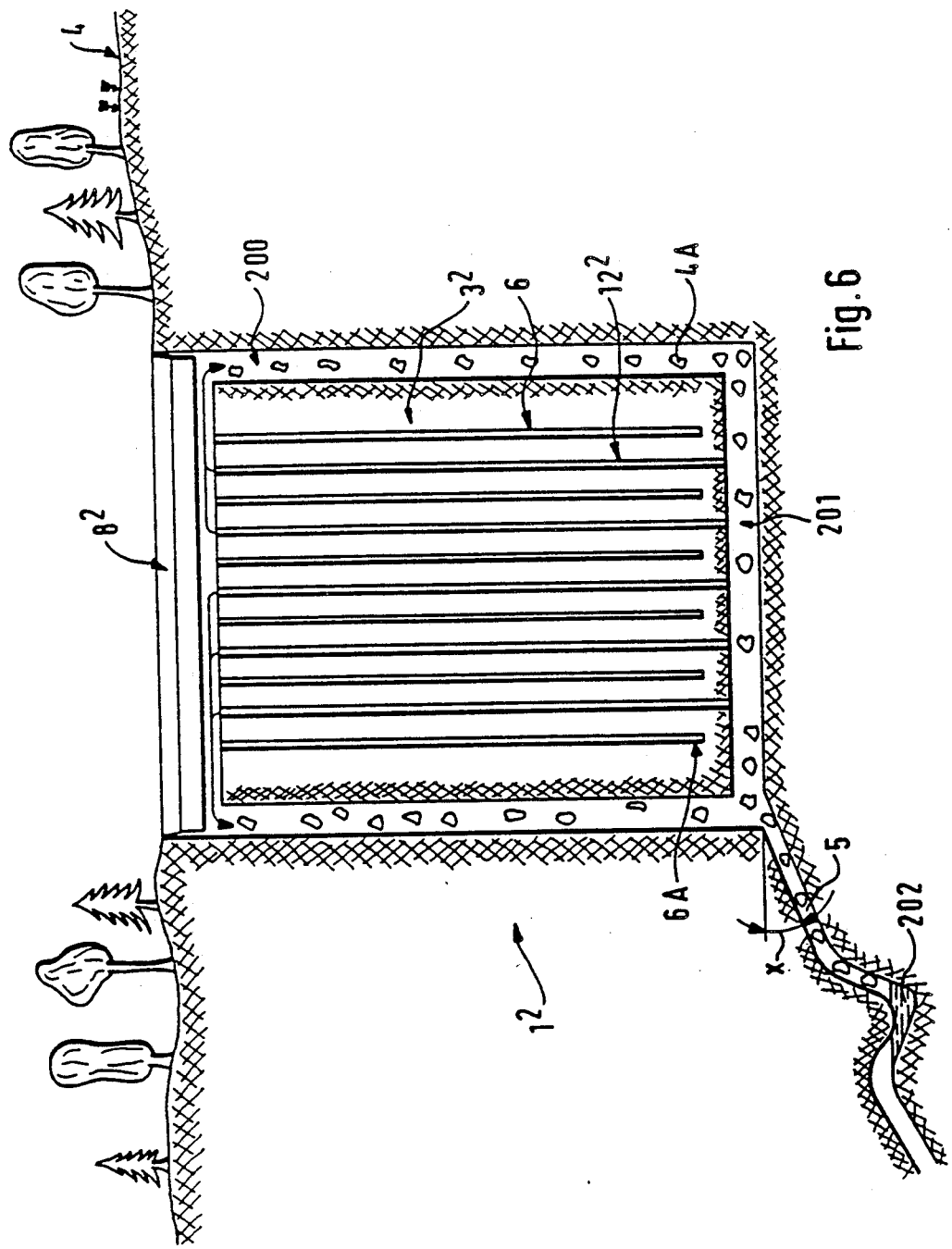

STORE

The present invention relates to a store for the storage of environmentally harmful substances, such as stable toxic compounds and long-lived nuclear materials, etc., which store comprises a number of cavities in rock intended for holding the substances in question, with a roof above said cavities, and with the cavities in question being surrounded by a hydraulic barrier.

With regard to the storage of harmful substances such as stable toxic compounds or long-lived nuclear materials, the prior art is such that no system which may be regarded as satisfactory exists. Previous solutions applied to the problem of disposing of these harmful substances have customarily involved the dumping of the substances at sea or on refuse tips on the one hand, and on the other hand the recovery or degradation of the substances by industrial processes. More often than not the result has not been what was intended. In most cases the processes have resulted in the formation of new harmful substances and undesirable emissions into the biosphere. Dumping at sea or on refuse tips has resulted in the substances in question being distributed with the currents or finding their way into the ground water. The intention of the present invention is to keep water away from these harmful substances and in this way to prevent their distribution. The store can be used as a temporary store until such time as reliable process technology has been developed, or as a final store, which, after it has been sealed, does not require any further maintenance or supervision.

Stores of the kind described above are previously disclosed in, for example, SE, B, No. 8305025-2 and GB, A, No. 2,166,282. The store in accordance with the Swedish invention requires pumps, etc., in order, amongst other things, to solve the problem associated with drainage. The construction of the storage space of said store for holding the substances concerned, which it is wished to store enclosed by rock, is an extremely complicated procedure, as is also the case with the store previously disclosed in the aforementioned British invention.

The principal object of the present invention is thus to make available a store which, amongst other things, solves the above-mentioned problems associated with the provision of a so-called "dry store" for the storage of harmful substances such as harmful toxic and nuclear materials, for example the waste from nuclear power stations and the like.

Said object is achieved by means of a store in accordance with the present invention, which is characterized essentially in that holding cavities for storage are formed by drilled vertical holes which extend down to a level situated above a subjacent drainage and ventilation zone, and in that the hydraulic barrier, which is displaced laterally in relation to the storage boreholes, and the ventilation holes situated to the side are connected to a subjacent drainage and ventilation zone.

The invention is described below as a preferred illustrative embodiment, in conjunction with which reference is made to the accompanying drawings, in which:

FIG. 2 illustrates in diagrammatic form a second example of a store;

FIG. 3 illustrates a preferred capsule for the enclosure of environmentally harmful substances;

FIG. 4 illustrates a store in cross-section;

FIG. 6 illustrates a further example of a store in cross-section.

Figure 1:
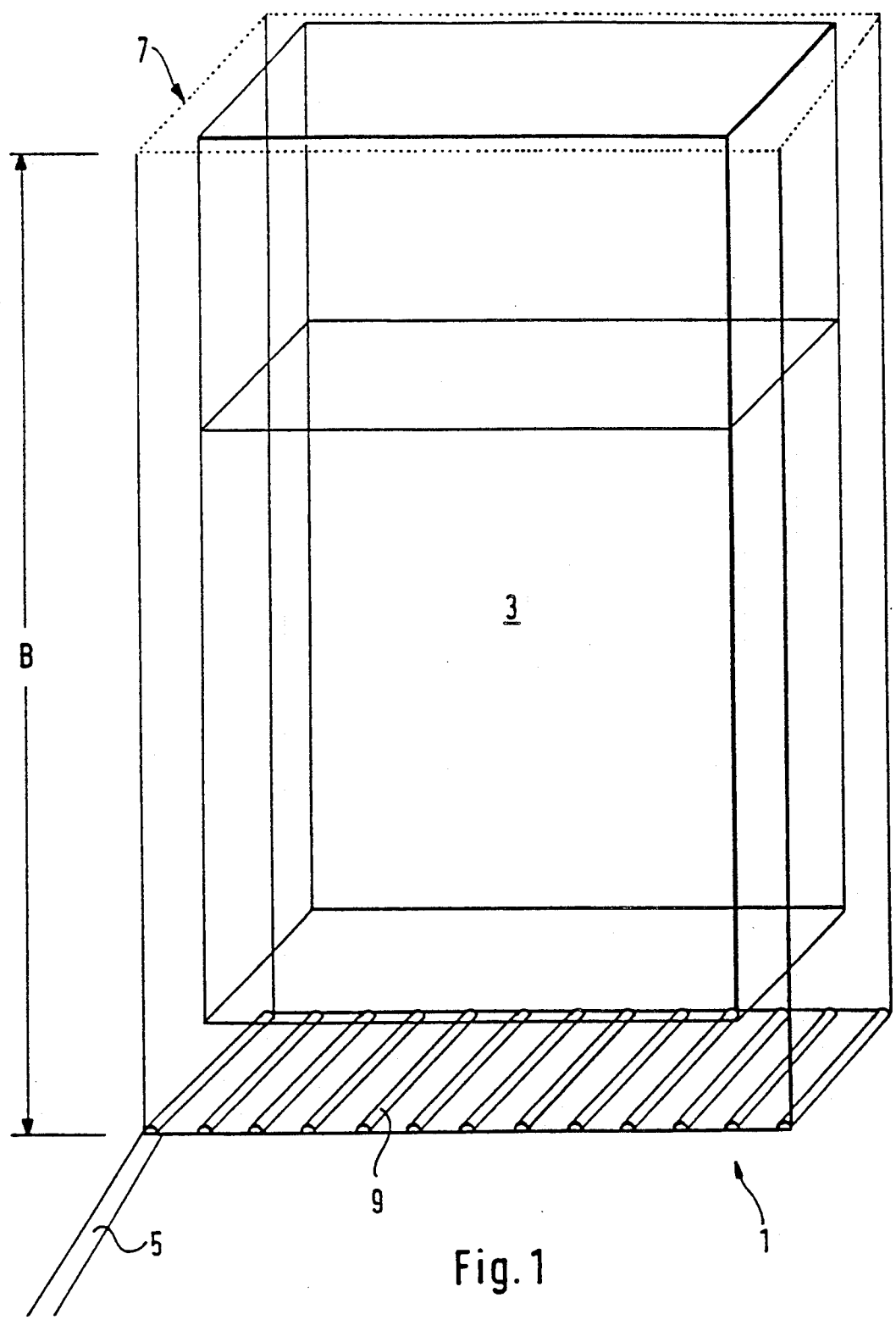
FIG. 1 illustrates in diagrammatic form a first illustrative embodiment of a store in accordance with the invention.
Figure 5:
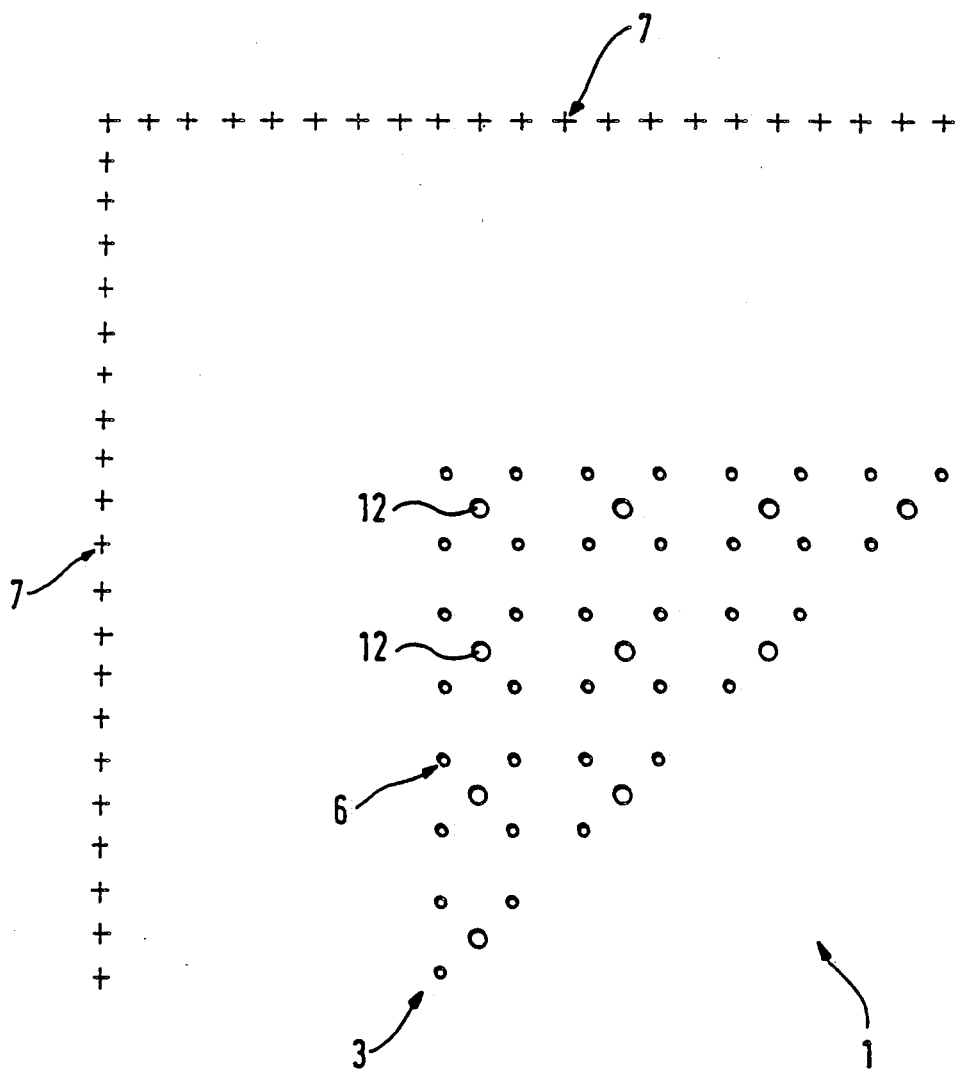
FIG. 5 illustrates a part of the intended pattern of construction of the store.

The present invention relates to a store 1, in which harmful substances 2 such as stable toxic or long-lived nuclear materials can be stored. The holding store, which consists of a storage area 3, $3^1$, $3^2$, is preferably contained within a rock formation 4, which rises above an adjacent syncline. An outlet tunnel 5 with an incline X of a few degrees, preferably in excess of 3°, is blasted from the syncline upwards into the rock formation 4. The height and level of the storage area can be adapted to the height of the rock formation above the syncline and to its horizontal extent. The storage area is constructed in the form of drilled vertical holes 6 above the level of the tunnel in the rock. One or more rows of boreholes 7 are constructed around the storage area 3, $3^1$, which boreholes are connected to the outlet tunnel 5 beneath the storage area 3. A water-tight roof 8; $8^2$ is cast over the storage area 3.

The store 1, $1^1$, $1^2$ can be constructed in a rock formation 4, which may consist of solid or fissured rock, although rock with wide, undesired crushing zones should be avoided.

Tunnels 9 are constructed in the first illustrative embodiments of stores 1, $1^1$, which tunnels are inclined preferably at $>3°$ in a direction away from the storage area 3, $3^1$ towards the outlet tunnel 5, and beneath same, said subjacent tunnels 9 being intended to function as drainage and ventilation tunnels. The function of the drainage and ventilation tunnels is to endeavour to keep the storage area 3, $3^1$ dry and to carry away any heat in the event of the substances 2 giving off heat in storage, whilst the purpose of the outlet tunnel 5 is to lead away any ground water which finds its way into the storage area 3, $3^1$.

The rows of holes 7, $7^1$ drilled around and at an appropriate distance from the storage area 3, $3^1$ are so arranged as to function as drainage holes and extend from the surface of the rock formation down to the aforementioned tunnels 9 which provide drainage. These surrounding rows of vertical outer boreholes 7, $7^1$ may be described as a "hydraulic barrier", the function of which is to lead away any ground water which finds its way into the storage area 3, $3^1$ and the run-off from the roof 8, $8^2$.

The holding holes 6 drilled in the storage area extend down to a level 10, which is situated above the zone 11 in which the drainage and ventilation tunnels 9 are arranged.

In order to be able to carry away any heat from the holding boreholes 6 to the subjacent drainage and ventilation tunnels 9, should the need arise, vertical ventilation boreholes 12, $12^2$ are drilled into the rock 4 and said storage area 3, $3^1$, $3^2$, which boreholes are connected to said drainage and ventilation tunnels 9.

The substances 2, such as fuel rods, for example, can be lowered down to the bottom 6A of the holding boreholes and can be encapsulated efficiently and reliably in containers 13 of a certain kind. For example, said containers 13 may consist of an outer casing 14 in the form of a steel tube with an internal liner 15 made of bentonite and a lining 16 of sintered steel, or enamelled, with the substance 2 in question which it is wished to store being accommodated in the internal space 13A. The container 13 can be sealed by means of a sintered lid made of stainless steel. A bentonite liner 18 can be so arranged as to form a seal between the substances 2 which are being stored.

The roof 8; $8^2$ may consist of various layers of concrete 19 and of bentonite or some other sealing layer 20 of material, with a draining material 21 such as macadam between each layer of concrete 19, covered by a layer of soil 22.

Dry storage is obtained inside the storage area 3; $3^1$ which is drained of water. No water is present, which could carry the harmful substances 2 into the ground water. Corrosion of the containers or capsules 13 in which the harmful substances 2 are stored is minimized, or ceases entirely, since stress corrosion will not occur in a dry store.

In the embodiment in accordance with FIGS. 1 and 4, storage requires the furl element to be stripped, and four fuel rods 2 to be placed inside a container 13 with a diameter of 60 mm, for example, which is then lowered into boreholes 6 with a diameter of 70 mm, for example, in a store 1, which may be contained within an overall horizontal surface area of approximately 110,000 $m^2$ and with a total depth of approximately 300 m, whereas in the embodiment in accordance with FIG. 2 the requirement for dry storage is for fuel elements to be placed intact in boreholes with a diameter of, for example, 250 mm (BWR) and 350 mm (PWR) within a horizontal surface area of approximately 27,000 $m^2$, but with the same borehole depth B as in above.

FIG. 6 shows a further illustrative embodiment, which differs from said previous store on a number of points. The hydraulic barrier may be produced as an alternative in the form of an artificial crushing zone 200 of optional width; i.e. the solid rock 4 is blasted into fragments 4A, in which case the efficiency of the hydraulic barrier will be considerably higher than when boreholes alone are present. Boreholes can be drilled in accordance with said previous proposal, although they are used as holes for the explosive charges. Blasting can take place by inverted benching (or, more generally, sub-level stoping), or by vertical crater retreat (VCR). The advantage of this is that any stresses in the rock are neutralized. Movements outside the store $1^2$, which are caused for one reason or another, for example such as earthquakes, land upheaval and subsidence, will essentially not spread to the store $1^2$ itself, depending on the width of the crushing zone and the magnitude of the movement. If blasting of the crushing zone 201 is also performed beneath the store $1^2$, as shown in FIG. 6, damping of any movements in the rock 4 can be further increased. It will also be extremely difficult to gain access to the nuclear waste, etc., 2 from below. Another advantage of using the crushing zone 200 in place of boreholes as a hydraulic barrier is that the ventilating boreholes $12^2$ can be connected to the crushing zone 200, 201. Any residual heat given off by the waste capsules 2 can thus be led away into the crushing zone 200, 201 by convection, without entering the biosphere, and could possibly be recovered via a heat pump system, for example. Any moisture which may form inside the store $1^2$ will condense onto the cold external walls of the crushing zone, and can be led away.

A water trap 202 can be provided in the drainage tunnel 5, in order both to prevent unauthorized persons and animals from approacing the store $1^2$, and to prevent air from finding its way into the store $1^2$.

The essential features of the invention are that the holding cavities for storing the substances 2 are formed by drilled vertical holes 6, in which case any desired width can be selected according to requirements, and that these storage boreholes 6 extend down to a level such that their bottoms 6A are situated clearly above the subjacent drainage and ventilation zone 9; 201, for example at a distance of 10-25 m, and that the hydraulic barrier 7, 200, which is displaced laterally in relation to the storage boreholes 6, and the ventilation holes 12, $12^2$ situated to the side are connected to a subjacent drainage and ventilation zone 9, 201. The possibility is provided in this way of obtaining a simple, reliable and functional store for the passive dry storage of harmful substances, without the need for fans or pumps to be provided for the purpose of cooling or draining the store.

Said subjacent drainage and ventilation zone 201 can in this way preferably consist of a crushing zone, that is to say a space in the rock which contains rock fragments 4A, for example rock 4 which has been blasted.

The laterally displaced hydraulic barrier 200 can appropriately consist of a crushing zone of the kind indicated above.

A crushing zone 200 can appropriately extend around the whole of the holding store $1^2$, for example at a distance of approximately 25 meters from the storage area $3^2$, in the form of a square, and at least also along its underside, with the crushing zones 200, 201 being connected to one another.

The storage boreholes 6 are so arranged as to be sealed by means of plugs, which can be formed from alternating layers of concrete and bentonite, for example with a thickness of 50-100 m.

The invention is not restricted to the illustrative embodiment of a store described above and illustrated in the drawings, but may be modified within the scope of the Patent Claims without departing from the idea of invention.

We claim:

1. A store for the storage of environmentally harmful substances, comprising:
   substantially vertical holding cavities disposed in a rock formation,
   a roof disposed above said cavities,
   a drainage and ventilation zone disposed subjacent said holding cavities,
   substantially vertical ventilation passages disposed among said holding cavities, said ventilation passages being in communication with said drainage and ventilation zone, and
   an hydraulic barrier surrounding said cavities and said ventilation passages.

2. A store according to claim 1, wherein said drainage and ventilation zone comprises blasted rock fragments.

3. A store according to claim 1, wherein said hydraulic barrier comprises blasted rock fragments.

4. A store according to claim 1, wherein said drainage and ventilation zone is inclined away from said holding cavities.

5. A store according to claim 4, further comprising an outlet tunnel in communication with said drainage and ventilation zone, said tunnel being inclined away from said holding cavities.

6. A store according to claim 5, further comprising a water trap disposed in said outlet tunnel.

7. A store according to claim 3, wherein said hydraulic barrier comprises blasted rock fragments, said hydraulic barrier extending around a circumference and a bottom side of said cavities and said ventilation passages, wherein all sections of said hydraulic barrier are interconnected.

8. A store according to claim 1, further comprising a multiple layer concrete and bentonite roof disposed along a top surface.

9. A store according to claim 1, wherein said holding cavities terminate at a distance approximately 10-25 meters above said underside of said hydraulic barrier.

10. A store according to claim 1, further comprising concrete and bentonite plugs having a thickness of approximately 50-100 meters, said plugs arranged and constructed to seal said holding cavities.

11. A store according to claim 2, wherein said hydraulic barrier comprises blasted rock fragments.

12. A store according to claim 2, wherein said drainage and ventilation zone is inclined away from said holding cavities.

13. A store according to claim 3, wherein said drainage and ventilation zone is inclined away from said holding cavities.

14. A store according to claim 4, wherein said hydraulic barrier comprises blasted rock fragments, said hydraulic barrier extending around a circumference and a bottom side of said cavities and said ventilation passages, wherein all sections of said hydraulic barrier are interconnected.

15. A store according to claim 5, wherein said hydraulic barrier comprises blasted rock fragments, said hydraulic barrier extending around a circumference and a bottom side of said cavities and said ventilation passages, wherein all sections of said hydraulic barrier are interconnected.

16. A store according to claim 6, wherein said hydraulic barrier comprises blasted rock fragments, said hydraulic barrier extending around a circumference and a bottom side of said cavities and said ventilation passages, wherein all sections of said hydraulic barrier are interconnected.

17. A store according to claim 2, further comprising a multiple layer concrete and bentonite roof disposed along a top surface.

18. A store according to claim 3, further comprising a multiple layer concrete and bentonite roof disposed along a top surface.

19. A store according to claim 4, further comprising a multiple layer concrete and bentonite roof disposed along a top surface.

20. A store according to claim 5, further comprising a multiple layer concrete and bentonite roof disposed along a top surface.

* * * * *